US012567761B2

(12) United States Patent
Chen et al.

(10) Patent No.: US 12,567,761 B2
(45) Date of Patent: Mar. 3, 2026

(54) RECTIFIER CONVERTER OF UNINTERRUPTIBLE POWER SUPPLY AND METHOD FOR CONTROLLING THE SAME

(71) Applicant: VERTIV TECH CO., LTD., Guangdong (CN)

(72) Inventors: Peng Chen, Guangdong (CN); Yang Bing, Guangdong (CN)

(73) Assignee: Vertiv Tech Co., Ltd., Shenzhen (CN)

( * ) Notice: Subject to any disclaimer, the term of this patent is extended or adjusted under 35 U.S.C. 154(b) by 262 days.

(21) Appl. No.: 18/118,100

(22) Filed: Mar. 6, 2023

(65) Prior Publication Data

US 2024/0097575 A1 Mar. 21, 2024

(30) Foreign Application Priority Data

Sep. 21, 2022 (CN) .......................... 202211155674.X

(51) Int. Cl.
*H02J 9/06* (2006.01)
*H02M 7/487* (2007.01)

(52) U.S. Cl.
CPC ................ *H02J 9/062* (2013.01); *H02J 9/06* (2013.01); *H02M 7/487* (2013.01)

(58) Field of Classification Search
CPC .................................... H02J 9/06; H02J 9/062
See application file for complete search history.

(56) References Cited

U.S. PATENT DOCUMENTS

2011/0227418 A1 9/2011 Pyboyina et al.
2015/0054343 A1 2/2015 Cui

FOREIGN PATENT DOCUMENTS

| CN | 103427481 A | * 12/2013 |
| CN | 106411164 A | * 2/2017 |
| EP | 2846436 A1 | 3/2015 |
| WO | 2017024642 A1 | 2/2017 |

OTHER PUBLICATIONS

Translation of CN103427481 (Year: 2013).*
Extended Search Report in corresponding European Patent Application No. 23157883.2 dated Sep. 27, 2023.

* cited by examiner

*Primary Examiner* — Thienvu V Tran
*Assistant Examiner* — Jennifer C Caulk
(74) *Attorney, Agent, or Firm* — Harness, Dickey & Pierce, P.L.C.

(57) ABSTRACT

A rectifier converter of the UPS includes a rectifier discharge reuse module, a first mains switching module, a second mains switching module and a battery switching module. The rectifier discharge reuse module includes a filtering unit and a rectifier discharge unit that are connected to each other; the battery switching module is connected between a battery power supply and the filtering unit, and operates in a case that the battery power supply supplies power to the rectifier converter; and the first mains switching module is connected between a mains power supply and the filtering unit, the second mains switching module is connected between the filtering unit and the rectifier discharge unit, and the first mains switching module and the second mains switching module operate in a case that the mains power supply supplies power to the rectifier converter.

13 Claims, 11 Drawing Sheets

RECTIFIER CONVERTER OF UNINTERRUPTIBLE POWER SUPPLY AND METHOD FOR CONTROLLING THE SAME

CROSS REFERENCE OF RELATED APPLICATION

The present application claims priority to Chinese Patent Application No. 202211155674.X, titled "RECTIFIER CONVERTER OF UNINTERRUPTIBLE POWER SUPPLY AND METHOD FOR CONTROLLING THE SAME" and filed on Sep. 21, 2022 with the China National Intellectual Property Administration, which is incorporated herein by reference in its entirety.

FIELD

The present disclosure relates to the field of power supplies, and more specifically, to a rectifier converter of an uninterruptible power supply and a method for controlling the same.

BACKGROUND

With the increase of the demand for data protection and the reliability of power consumption, an uninterruptible power supply (UPS) may provide a reliable power supply, and thus is increasingly widely used. Normally, the UPS includes a rectifier converter, and is required to achieve the following two functions: converting alternating-current mains power into direct-current power for an inverter and a battery pack; and transmitting power of the battery pack to a direct-current bus without mains power supply. A Vienna topology is widely used in a rectifier circuit of the UPS. In order to achieve the uninterrupted power supply, the battery pack is normally provided with an independent discharger. Therefore, as shown in FIG. 1, a rectifier converter with the Vienna topology includes a Vienna rectifier and an independent battery discharger. In a mains power supply mode, the independent battery discharger is idle; and in a battery power supply mode, the Vienna rectifier is idle, which results in low device utilizations, high cost and large volume of the rectifier converter and a UPS system including the rectifier converter.

SUMMARY

In order to solve the technical problem of low device utilizations, high cost and large volume of a rectifier converter and a UPS system including the rectifier converter according to the conventional technology, a rectifier converter of a UPS and a method for controlling a rectifier converter of a UPS are provided according to the present disclosure, which can reuse the Vienna rectifier and the battery discharger, to save devices, and greatly reduce the cost and the volume of the UPS.

The following technical solutions are provided according to the present disclosure. A rectifier converter of an uninterruptible power supply (UPS) is provided. The rectifier converter includes a rectifier discharge reuse module, a first mains switching module, a second mains switching module and a battery switching module. The rectifier discharge reuse module includes a filtering unit and a rectifier discharge unit that are connected to each other. The battery switching module is connected between a battery power supply and the filtering unit, and operates in a case that the battery power supply supplies power to the rectifier converter, to control the filtering unit and the rectifier discharge unit to discharge and output a current inputted from the battery power supply. The first mains switching module is connected between a mains power supply and the filtering unit; the second mains switching module is connected between the filtering unit and the rectifier discharge unit; and the first mains switching module and the second mains switching module operate in a case that the mains power supply supplies power to the rectifier converter, to control the filtering unit and the rectifier discharge unit to rectify and output a current inputted from the mains power supply.

In the rectifier converter of the UPS according to the present disclosure, the battery switching module includes a first switching device connected between an anode of the battery power supply and a first terminal of the filtering unit, and a second switching device connected between a cathode of the battery power supply and a second terminal of the filtering unit.

In the rectifier converter of the UPS according to the present disclosure, the first mains switching module includes a third switching device connected between the mains power supply and the first terminal of the filtering unit, and a fourth switching device connected between the mains power supply and the second terminal of the filtering unit.

The second mains switching module includes a fifth switching device, where a first terminal of the fifth switching device is connected to a third terminal of the filtering unit and a first terminal of the rectifier discharge unit, and a second terminal of the fifth switching device is connected to a fourth terminal of the filtering unit and a second terminal of the rectifier discharge unit.

In the rectifier converter of the UPS according to the present disclosure, in a case that the mains power supply supplies power to the rectifier converter, the third switching device, the fourth switching device and the fifth switching device are turned on, the first switching device and the second switching device are turned off, and the filtering unit and the rectifier discharge unit are configured to rectify and output the current inputted by the mains power supply.

In the rectifier converter of the UPS according to the present disclosure, when a power supply of the rectifier converter is started to be switched from the mains power supply to the battery power supply, a first driving signal is transmitted to drive the third switching device, the fourth switching device and the fifth switching device to be turned off, on receipt of the first driving signal, the third switching device, the fourth switching device and the fifth switching device are turned off, a second driving signal is transmitted to drive the first switching device and the second switching device to be turned on, on receipt of the second driving signal, the first switching device and the second switching device are turned on, and the filtering unit and the rectifier discharge unit are configured to discharge and output the current inputted from the battery power supply. The third switching device, the fourth switching device and the fifth switching device are actually turned off at a time instant later than a time instant when the first driving signal is transmitted; and the first switching device and the second switching device are actually turned on at a time instant later than a time instant when the second driving signal is transmitted.

In the rectifier converter of the UPS according to the present disclosure, when a power supply of the rectifier converter is started to be switched from the battery power supply to the mains power supply, a third driving signal is transmitted to drive the first switching device and the second switching device to be turned off, on receipt of the third driving signal, the first switching device and the second switching device are turned off, a fourth driving signal is transmitted to drive the third switching device, the fourth switching device and the fifth switching device to be turned on, on receipt of the fourth driving signal, the third switching device, the fourth switching device and the fifth switching device are turned on, and the filtering unit and the rectifier discharge unit are configured to rectify and output the current inputted from the mains power supply. The first switching device and the second switching device are actually turned off at a time instant later than a time instant when the third driving signal is transmitted; and the third switching device, the fourth switching device and the fifth switching device are actually turned on at a time instant later than a time instant when the fourth driving signal is transmitted.

In the rectifier converter of the UPS according to the present disclosure, each of the first switching device, the second switching device, the third switching device and the fourth switching device includes a relay or a contactor, and the fifth switching device includes a relay, a contactor or a diode.

In the rectifier converter of the UPS according to the present disclosure, each of the first switching device and the second switching device is connected in parallel with a thyristor.

In the rectifier converter of the UPS according to the present disclosure, the filter uniting includes a first inductor and a second inductor. A first terminal of the first inductor is connected to a first terminal of the first mains switching module and a first terminal of the battery switching module, a first terminal of the second inductor is connected to a second terminal of the first mains switching module and a second terminal of the battery switching module, a second terminal of the first inductor is connected to a first terminal of the rectifier discharge unit, and a second terminal of the second inductor is connected to a second terminal of the rectifier discharge unit.

In the rectifier converter of the UPS according to the present disclosure, the rectifier discharge unit includes a first rectifier device, a second rectifier device, a third diode, a fourth diode, a first switching transistor, a second switching transistor, a first capacitor and a second capacitor. A first terminal of the first rectifier device and a first terminal of the first switching transistor are connected to a second terminal of the first inductor and a first terminal of the second mains switching module; a second terminal of the first rectifier device is connected to a first terminal of the first capacitor; a second terminal of the second rectifier device and a second terminal of the second switching transistor are connected to a second terminal of the second inductor and a second terminal of the second mains switching module, a first terminal of the second rectifier device is connected to a second terminal of the second capacitor, a second terminal of the first switching transistor is connected to a first terminal of the third diode, and a second terminal of the third diode is connected to the second terminal of the second capacitor, a first terminal of the second switching transistor is connected to a second terminal of the fourth diode, a first terminal of the fourth diode is connected to a first terminal of the second capacitor, and a control terminal of the first switching transistor and a control terminal of the second switching transistor are configured to receive control signals.

In the rectifier converter of the UPS according to the present disclosure, the first rectifier device includes a first diode, and the second rectifier device includes a second diode. An anode of the first diode is connected to the first terminal of the first switching transistor and the second terminal of the first inductor, and a cathode of the first diode is connected to the first terminal of the first capacitor; a cathode of the second diode is connected to the second terminal of the second switching transistor and the second terminal of the second inductor, and an anode of the second diode is connected to the second terminal of the second capacitor.

In the rectifier converter of the UPS according to the present disclosure, the first rectifier device includes a third switching transistor, and the second rectifier device includes a fourth switching transistor. A third terminal of the third switching transistor and a third terminal of the fourth switching transistor are configured to receive control signals, a first terminal of the third switching transistor is connected to the first terminal of the first switching transistor and the second terminal of the first inductor, and a second terminal of the third switching transistor is connected to the first terminal of the first capacitor; and a second terminal of the fourth switching transistor is connected to the second terminal of the second switching transistor and the second terminal of the second inductor, and a first terminal of the fourth switching transistor is connected to the second terminal of the second capacitor.

In the rectifier converter of the UPS according to the present disclosure, each of the first switching transistor and the second switching transistor includes a triode, MOSFET or IGBT.

In the rectifier converter of the UPS according to the present disclosure, each of the first switching transistor and the second switching transistor is connected in parallel with a reverse diode, or the first switching transistor and the second switching transistor have respective body diodes.

In order to solve the technical problem, a method for controlling a rectifier converter of an uninterruptible power supply (UPS) is provided according to another technical solution of the present disclosure. The method is applied to the rectifier converter of the UPS, and includes:

controlling the first mains switching module and the second mains switching module to be turned on, and the battery switching module to be turned off, to control the filtering unit and the rectifier discharge unit to rectify and output the current inputted by the mains power supply, in a case that the mains power supply supplies power to the rectifier converter; and controlling the battery switching module to be turned on, and the first mains switching module and the second mains switching module to be turned off, to control the filtering unit and the rectifier discharge unit to discharge and output the current inputted from the battery power supply, in a case that the battery power supply supplies power to the rectifier converter.

In the rectifier converter of the UPS and the method for controlling the rectifier converter of the UPS, the first mains switching module, the second mains switching module and the battery switching module can switch the rectifier discharge reuse module in two cases of the mains power supply and the battery power supply, and the rectifier discharge reuse module can achieve the functions of the rectifier and the battery discharger, that is, the rectifier and the battery discharger are reused, thereby saving devices and greatly reducing the cost and the volume of the UPS.

BRIEF DESCRIPTION OF THE DRAWINGS

The present disclosure is further illustrated hereinafter in conjunction with the drawings and embodiments. In the drawings.

DETAILED DESCRIPTION

In order to illustrate the objectives, technical solutions and advantages of the present disclosure more clearly, the present disclosure is further described in detail below in conjunction with the drawings and embodiments. It should be understood that the embodiments described herein are only used to explain the present disclosure and not to limit the present disclosure.

The present disclosure relates to a rectifier converter of a UPS, the rectifier converter includes a rectifier discharge reuse module, a first mains switching module, a second mains switching module and a battery switching module. The rectifier discharge reuse module includes a filtering unit and a rectifier discharge unit that are connected to each other. The battery switching module is connected between a battery power supply and the filtering unit, and operates in a case that the battery power supply supplies power to the rectifier converter, to control the filtering unit and the rectifier discharge unit to discharge and output a current inputted from the battery power supply. The first mains switching module is connected between a mains power supply and the filtering unit. The second mains switching module is connected between the filtering unit and the rectifier discharge unit. The first mains switching module and the second mains switching module operate in a case that the mains power supply supplies power to the rectifier converter, to control the filtering unit and the rectifier discharge unit to rectify and output a current inputted from the mains power supply. According to the present disclosure, the first mains switching module, the second mains switching module and the battery switching module can switch the rectifier discharge reuse module in two cases of the mains power supply and the battery power supply, and the rectifier discharge reuse module can achieve the functions of the rectifier and the battery discharger, that is, the rectifier and the battery discharger are reused, thereby saving devices and greatly reducing the cost and the volume of the UPS.

Figure 2:
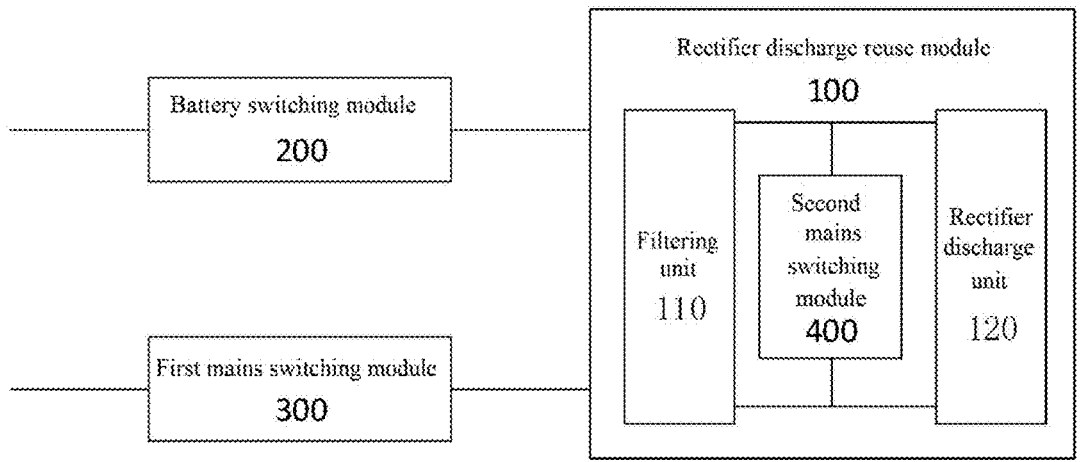
FIG. 2 is a schematic block diagram of a rectifier converter of a UPS according to an embodiment of the present disclosure.

FIG. 2 is a schematic block diagram of a rectifier converter of a UPS according to an embodiment of the present disclosure. As shown in FIG. 2, the rectifier converter of the UPS according to the present disclosure includes a rectifier discharge reuse module 100, a first mains switching module 300, a second mains switching module 400 and a battery switching module 200. The rectifier discharge reuse module 100 includes a filtering unit 110 and a rectifier discharge unit 120 that are connected to each other. The battery switching module 200 is connected between a battery power supply and the filtering unit 110, and operates in a case that the battery power supply supplies power to the rectifier converter, to control the filtering unit 110 and the rectifier discharge unit 120 to discharge and output a current inputted from the battery power supply. The first mains switching module 300 is connected between a mains power supply and the filtering unit 110. The second mains switching module 400 is connected between the filtering unit 110 and the rectifier discharge unit 120. The first mains switching module 300 and the second mains switching module 400 operate in a case that the mains power supply supplies power to the rectifier converter, to control the filtering unit 110 and the rectifier discharge unit 120 to rectify and output a current inputted from the mains power supply.

In an embodiment of the present disclosure, each of the first mains switching module 300, the second mains switching module 400, and the battery switching module 200 includes a switching device, such as a relay or a contactor. In a case that the mains power supply supplies power to the rectifier converter, the first mains switching module 300 and the second mains switching module 400 operate, that is, relays or contactors in the first mains switching module 300 and the second mains switching module 400 are turned on, so that the current inputted from the mains power supply is transmitted to the filtering unit 110 and the rectifier discharge unit 120 through the first mains switching module 300 and the second mains switching module 400. The filtering unit 110 filters the current inputted from the mains power supply and the rectifier discharge unit 120 rectifies and outputs the current inputted from the mains power supply. The battery switching module 200 includes a switching device, such as a relay or a contactor. In a case that the battery power supply supplies power to the rectifier converter, the battery switching module 200 operates, that is, the relay or the contactor in the battery switching module 200 is turned on, the filtering unit 110 filters the current inputted from the battery power supply, and the rectifier discharge unit 120 rectifies and outputs the current inputted from the battery power supply.

In an embodiment of the present disclosure, the filtering unit 110 includes a filtering inductor, and the rectifier discharge unit 120 includes a switching transistor bridge arm that serves as both a rectifier switching transistor and a discharge switching transistor.

According to the present disclosure, the first mains switching module, the second mains switching module and the battery switching module can switch the rectifier discharge reuse module in two cases of the mains power supply and the battery power supply, and the rectifier discharge reuse module can achieve the functions of the rectifier and the battery discharger, that is, the rectifier and the battery discharger are reused, thereby saving devices and greatly reducing the cost and the volume of the UPS.

Figure 3:
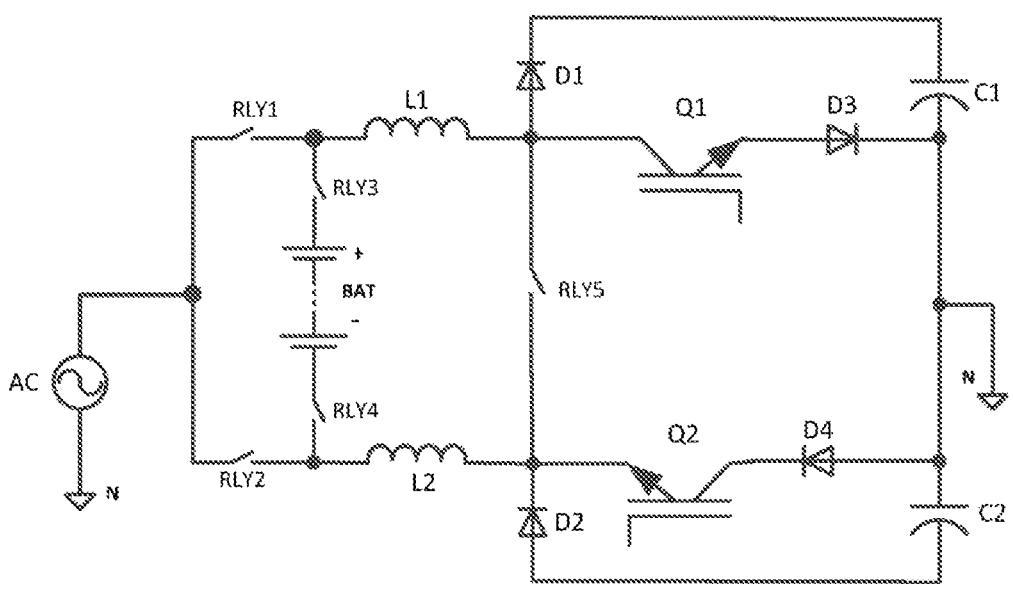
FIG. 3 is a circuit diagram of a rectifier converter of a UPS according to another embodiment of the present disclosure.

FIG. 3 is a circuit diagram of a rectifier converter of a UPS according to another embodiment of the present disclosure. As shown in FIGS. 2 and 3, the rectifier converter of the UPS according to the present disclosure includes the rectifier discharge reuse module 100, the first mains switching module 300, the second mains switching module 400 and the battery switching module 200. The rectifier discharge reuse module 100 includes the filtering unit 110 and the rectifier discharge unit 120 that are connected to each other. The battery switching module 200 is connected between the battery power supply and the filtering unit 110. The first mains switching module 300 is connected between the mains power supply and the filtering unit 110. The second mains switching module 400 is connected between the filtering unit 110 and the rectifier discharge unit 120.

In the embodiment shown in FIG. 3, the filtering unit 110 includes an inductor L1 and an inductor L2. The rectifier discharge unit 120 includes a diode D1, a diode D2, a diode D3, a diode D4, a switching transistor Q1, a switching transistor Q2, a capacitor C1 and a capacitor C2. The battery switching module 200 includes a relay RLY3 and a relay RLY4. The first mains switching module 300 includes a relay RLY1 and a relay RLY2. The second mains switching module 400 includes a relay RLY5. As shown in FIG. 3, a first terminal of the inductor L1 (that is, a first terminal of the filtering unit) is connected to a first terminal of the relay RLY1 (that is, a first terminal of the first mains switching module 300) and a first terminal of the relay RLY3 (that is, a first terminal of the battery switching module 200). A first terminal of the inductor L2 (that is, a second terminal of the filtering unit) is connected to a first terminal of the relay RLY2 (that is, a second terminal of the first mains switching module 300) and a first terminal of the relay RLY4 (that is, a second terminal of the battery switching module 200). A second terminal of the relay RLY1 and a second terminal of the relay RLY2 are connected to the mains power supply AC. A second terminal of the relay RLY3 is connected to an anode BAT+ of the battery power supply, and a second terminal of the relay RLY4 is connected to a cathode BAT− of the battery power supply.

A second terminal of the inductor L1 (that is, a third terminal of the filtering unit 110) is connected to an anode of the diode D1 and a collector of the switching transistor Q1 (that is, a first terminal of the rectifier discharge unit 120). The anode of the diode D1 and the collector of the switching transistor Q1 form the first terminal of the rectifier discharge unit 120. A second terminal of the inductor L2 (that is, a fourth terminal of the filtering unit) is connected to a cathode of the diode D2 and an emitter of the switching transistor Q2 (that is, a second terminal of the rectifier discharge unit 120). The second terminal of the inductor L1 (that is, the third terminal of the filtering unit 110) is connected to a first terminal of the relay RLY5 (that is, a first terminal of the second mains switching module 400). A cathode of the diode D1 is connected to a first terminal of the capacitor C1. An emitter of the switching transistor Q1 is connected to an anode of the diode D3, and a cathode of the diode D3 is connected to a first terminal of the capacitor C2. The second terminal of the inductor L2 (that is, the fourth terminal of the filtering unit) is connected to a second terminal of the relay RLY5 (that is, a second terminal of the second mains switching module 400). An anode of the diode D2 is connected to a second terminal of the capacitor C2. The collector of the switching transistor Q2 is connected to a cathode of the diode D4. An anode of the diode D4 is connected to the first terminal of the capacitor C2. A base of the switching transistor Q1 and a base of the switching transistor Q2 receive control signals. In the embodiment shown in FIG. 3, a second terminal of the capacitor C1 is connected to the first terminal of the capacitor C2, and a connection point of the second terminal of the capacitor C1 and the first terminal of the capacitor C2 serves as a midpoint N. In addition, in other embodiments of the present disclosure, a terminal of the battery power supply BAT serves as a midpoint of the battery and is connected to the midpoint N of the system.

In an embodiment of the present disclosure, the switching transistor Q1 and the switching transistor Q2 may be implemented by a triode, MOSFET or IGBT. The MOSFET may be SiMOS, SiCMOS, or GaN. In an embodiment of the present disclosure, each of the switching transistor Q1 and the switching transistor Q2 may be connected in parallel with a reverse diode. In an embodiment of the present disclosure, the switching transistor Q1 and the switching transistor Q2 have respective body diodes.

In an embodiment of the present disclosure, the relays RLY1 to RLY5 may be implemented by any appropriate switching devices, such as contactors or switches. In an embodiment of the present disclosure, the battery power supply includes a two-wire battery pack, and the UPS is connected to a positive terminal and a negative terminal of the battery pack.

As shown in FIG. 3, in the rectifier converter of the UPS, the relay RLY1, the inductor L1, the switching transistor Q1 and the diode D3 are connected in series, and the relay RLY2, the inductor L2, the switching transistor Q2 and the diode D4 are connected in series. The relay RLY1 and the relay RLY2 are connected to the mains power supply AC. The cathode of the diode D3 and the anode of the diode D4 are connected to the midpoint N. The battery power supply BAT is connected in series to the relay RLY3 and the relay RLY4. The relay RLY3 is connected to the relay RLY1, the relay RLY4 is connected to the relay RLY2, and the relay RLY5 is connected between the collector of the switching transistor Q1 and the emitter of the switching transistor Q2. The anode of the diode D1 is connected to the collector of the switching transistor Q1, and the cathode of the diode D1 is connected to the capacitor C1. The cathode of the diode D2 is connected to the emitter of the switching transistor Q2, and the anode of the diode D2 is connected to the capacitor C2.

In a case that the mains power supply AC supplies power to the rectifier converter, the relay RLY1, the relay RLY2, the relay RLY5, the inductor L1, the inductor L2, the switching transistor Q1, the switching transistor Q2, the diode D1, the diode D2, the diode D3, the diode D4, the capacitor C1 and the capacitor C2 operate. In a case that the battery power supply supplies power to the rectifier converter, the relay RLY3, the relay RLY4, the inductor L1, the inductor L2, the switching transistor Q1, the switching transistor Q2, the diode D1, the diode D2, the diode D3, the diode D4, the capacitor C1 and the capacitor C2 operate.

Figure 1:
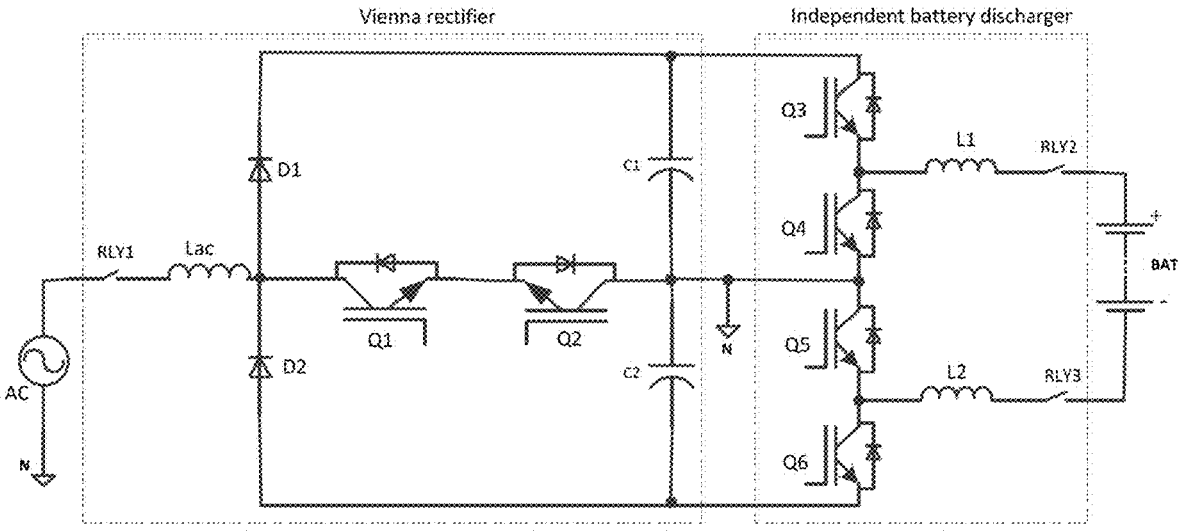
FIG. 1 is a schematic diagram of a rectifier converter according to the conventional technology.

Therefore, in the embodiment, the Vienna rectifier and the battery discharger are reused. In the mains power supply mode and the battery power supply mode, the relay RLY1, the relay RLY2, the relay RLY5, the relay RLY3 and the relay RLY4 are used to switch, to reuse the Vienna rectifier. Compared with the conventional rectifier converter of the UPS, especially the rectifier converter of the UPS shown in FIG. 1, the device utilization is improved.

Figure 4A:
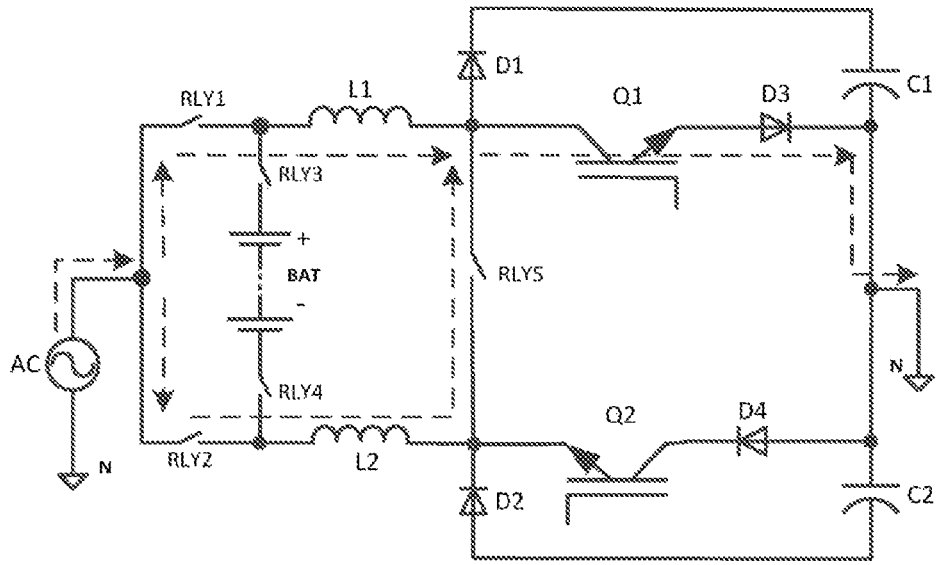
FIGS. 4A to 4D are schematic diagrams respectively showing a direction of a current flowing through a rectifier converter of a UPS shown in FIG. 3 in a case that a mains power supply supplies power to the rectifier converter.
Figure 4B:
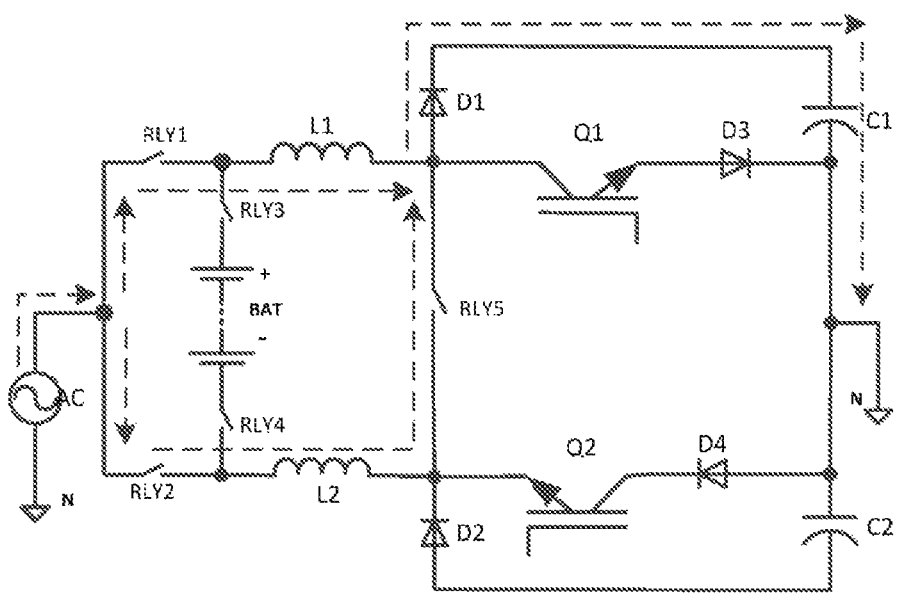
Figure 4C:
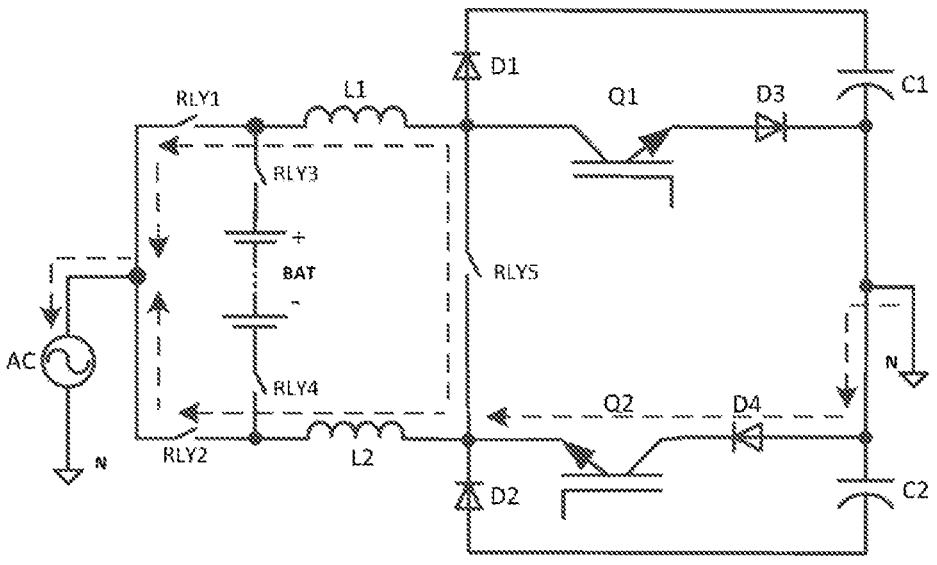
Figure 4D:
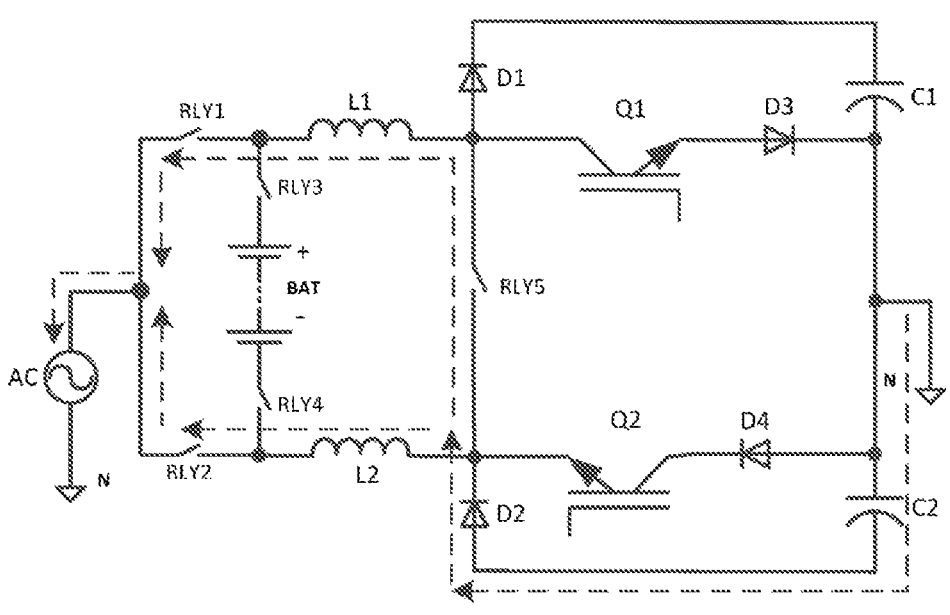
Figure 5A:
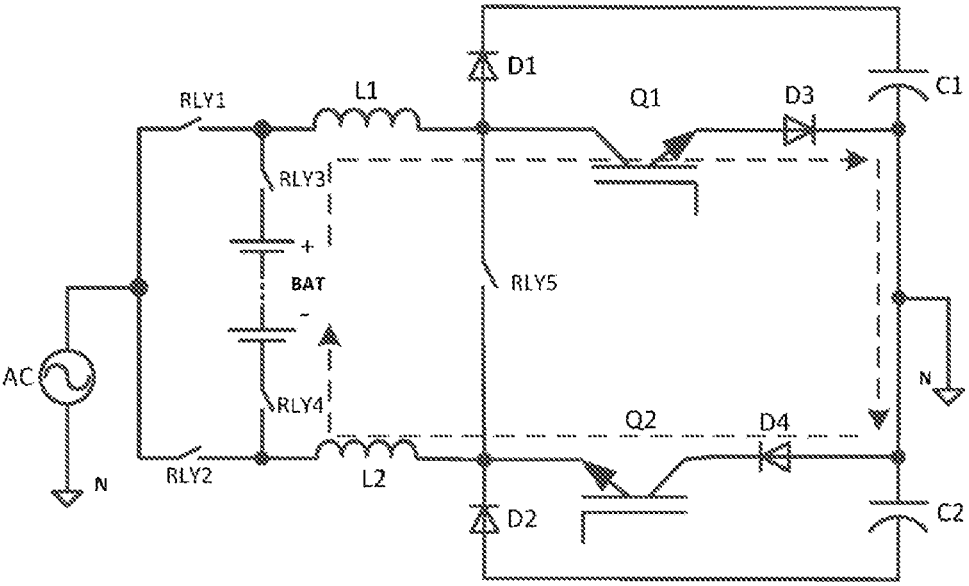
FIGS. 5A to 5B are schematic diagrams respectively showing a direction of a current flowing through a rectifier converter of a UPS shown in FIG. 3 in a case that a battery power supply supplies power to the rectifier converter.
Figure 5B:
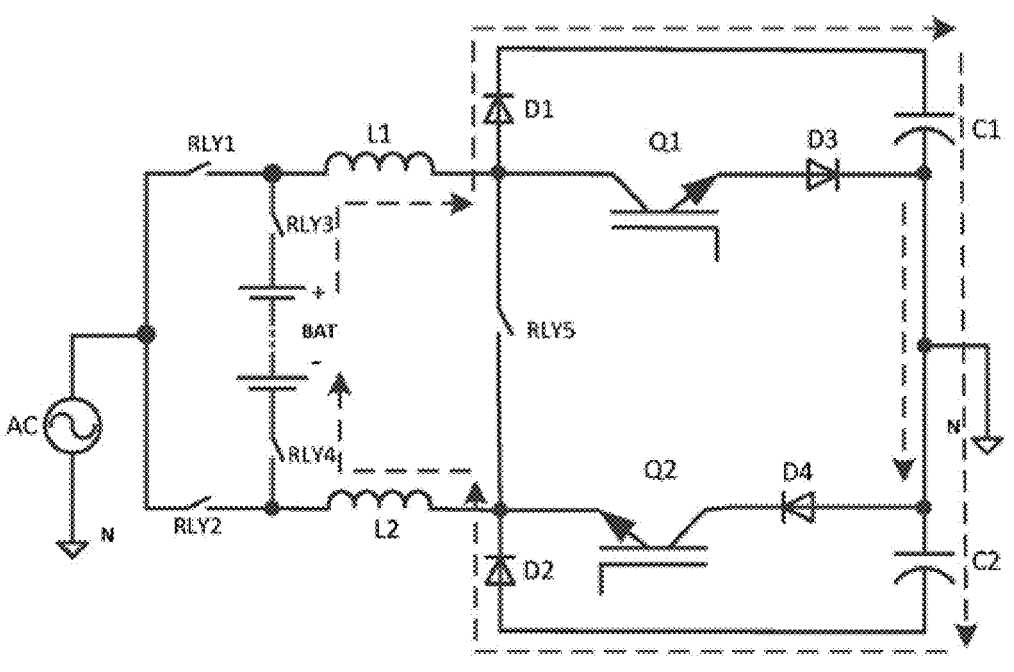

FIGS. 4A to 4D are schematic diagrams respectively showing a direction of a current flowing through a rectifier converter of a UPS shown in FIG. 3 in a case that a mains power supply supplies power to the rectifier converter. FIGS. 5A to 5B are schematic diagrams respectively showing a direction of a current flowing through a rectifier converter of a UPS shown in FIG. 3 in a case that a battery power supply supplies power to the rectifier converter. The principles of the rectifier converter of the UPS shown in FIG. 3 in two cases that the mains power supply supplies power to the rectifier converter and the battery power supply supplies power to the rectifier converter are described below in conjunction with FIGS. 4A to 4D and FIGS. 5A to 5B.

In a mains power supply mode, the relay RLY1, the relay RLY2 and the relay RLY5 are turned on, and the relay RLY3 and the relay RLY4 are turned off. In a case that the mains power supply is in a positive half cycle, the switching transistor Q1 performs PWM, and the switching transistor Q2 is turned off (which may be turned on or off simultaneously with the switching transistor Q1). When the switching transistor Q1 is turned on, the current inputted from the mains power supply flows through the relay RLY1, the relay RLY2, the inductor L1, the inductor L2, the relay RLY5, the switching transistor Q1 and the diode D3, and the current flowing through the inductor L1 and the inductor L2 increases, as shown in FIG. 4A. When the switching transistor Q1 is turned off, the current inputted from the mains power supply flows through the relay RLY1, the relay RLY2, the inductor L1, the inductor L2, the relay RLY5, the diode D1 and the capacitor C1, the current flowing through the inductor L1 and the inductor L2 decreases, and the current charges the capacitor C1, as shown in FIG. 4B. When the mains power supply is in a negative half cycle, the switching transistor Q2 performs PWM, and the switching transistor Q1 is turned off (which may be turned on or off simultaneously with the switching transistor Q2). When the switching transistor Q2 is turned on, the current inputted from the mains power supply flows through the relay RLY1, the relay RLY2, the inductor L1, the inductor L2, the relay RLY5, the switching transistor Q2 and the diode D4, and the current flowing through the inductor L1 and the inductor L2 increases, as shown in FIG. 4C. When the switching transistor Q2 is turned off, the current inputted from the mains power supply flows through the relay RLY1, the relay RLY2, the inductor L1, the inductor L2, the relay RLY5, the diode D2 and the capacitor C2, the current flowing through the inductor L1 and the inductor L2 decreases, and the current charges the capacitor C2, as shown in FIG. 4D.

In a battery power supply mode, the relay RLY1, the relay RLY2 and the relay RLY5 are turned off, and the relay RLY3 and the relay RLY4 are turned on. The switching transistor Q1 and the switching transistor Q2 perform PWM. When the switching transistor Q1 and the switching transistor Q2 are turned on, the current inputted from the battery power supply flows through the relay RLY3, the inductor L1, the switching transistor Q1, the diode D3, the diode D4, the switching transistor Q2, the inductor L2 and the relay RLY4, and the current flowing through the inductor L1 and the inductor L2 increases, as shown in FIG. 5A. When the switching transistor Q1 and the switching transistor Q2 are turned off, the current inputted from the battery power supply flows through the relay RLY3, the inductor L1, the diode D1, the capacitor C1, the capacitor C2, the diode D2, the inductor L2 and the relay RLY4, the current flowing through the inductor L1 and the inductor L2 decreases, and the current charges the capacitor C1 and the capacitor C2, as shown in FIG. 5B. In addition, in another embodiment of the present disclosure, in the battery power supply mode, the switching transistor Q1 and the switching transistor Q2 may be simultaneously turned on or turned off; or the switching transistor Q1 and the switching transistor Q2 may be independently controlled, and not be simultaneously turned on or turned off. The rectifier converter according to the present disclosure may be used in a single-phase rectifier converter circuit, a two-phase rectifier converter circuit, a three-phase rectifier converter circuit or a multi-phase rectifier converter circuit.

Figure 6:
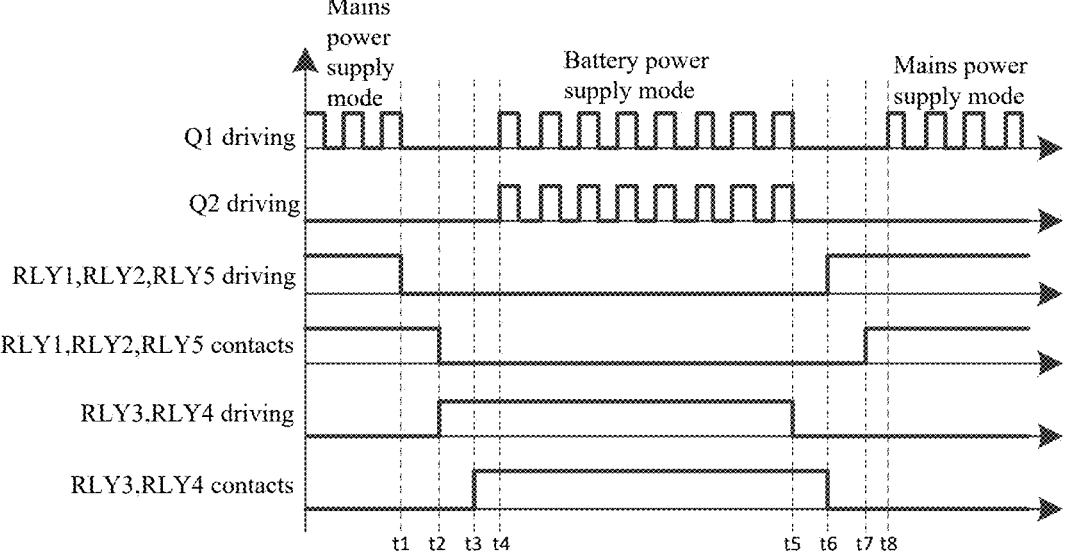
FIG. 6 is a sequence diagram showing switching between a battery power supply and a mains power supply for a rectifier converter of a UPS shown in FIG. 3.

FIG. 6 is a sequence diagram showing switching between a battery power supply and a mains power supply for a rectifier converter of a UPS shown in FIG. 3. The control process of switching devices in the rectifier converter of the UPS is described below in conjunction with FIG. 3, FIG. 4A to 4D, FIG. 5A to 5B and FIG. 6.

It is assumed that the mains power supply supplies power to the rectifier converter (that is, it may be regarded as the mains power supply mode) before a time instant t1, the mains power supply is in the positive half cycle, the switching transistor Q1 performs PWM, the switching transistor Q2 is turned off, the relay RLY1, the relay RLY2 and the relay RLY5 are turned on, and the relay RLY3 and the relay RLY4 are turned off. At a time instant t1, a power supply of the rectifier converter is started to be switched from the mains power supply to the battery power supply (that is, the mains power supply mode is started to be switched to the battery power supply mode). At the time instant t1, the switching transistor Q1 is turned off, and a first driving signal is transmitted to drive the relay RLY1, the relay RLY2 and the relay RLY5 to be turned off. Since a contact of a relay acts at a time instant later than a time instant when a driving signal is transmitted, contacts of the relay RLY1, the relay RLY2 and the relay RLY5 are still turned on at the time instant t1. At a time instant t2, the contacts of the relay RLY1, the relay RLY2 and the relay RLY5 are turned off. Therefore, the relay RLY1, the relay RLY2 and the relay RLY5 are actually turned off at the time instant later than the time instant when the first driving signal is transmitted.

At the time instant t2, a second driving signal is transmitted to drive the relay RLY3 and the relay RLY4 to be turned on. As described above, since a contact of a relay acts at a time instant later than the time instant when the driving signal is transmitted, contacts of the relay RLY3 and the relay RLY4 are still turned off. At a time instant t3, the contacts of the relay RLY3 and the relay RLY4 are turned on. Therefore, the relay RLY3 and the relay RLY4 are actually turned on at the time instant later than the time instant when the second driving signal is transmitted.

After a short time period, at a time instant t4, the battery power supply supplies power to the rectifier converter, that is, in the battery power supply mode, the switching transistor Q1 and the switching transistor Q2 perform PWM in the battery power supply mode, and the rectifier converter of the UPS completely operates in the battery power supply mode.

It is assumed that a power supply of the rectifier converter is started to be switched from the battery power supply to the mains power supply (that is, the battery power supply mode is started to be switched to the mains power supply mode) at a time instant t5, the mains power supply is in the positive half cycle, the switching transistor Q1 and the switching transistor Q2 are turned off, and a third driving signal is transmitted to drive the relay RLY3 and the relay RLY4 to be turned off. As described above, since a contact of a relay acts at a time instant later than a time instant when the driving signal is transmitted, the contacts of the relay RLY3 and the relay RLY4 are still turned on. At a time instant t6, the contacts of the relay RLY3 and the relay RLY4 are turned off, and the relay RLY3 and the relay RLY4 are actually turned off at a time instant later than a time instant when the third driving signal is transmitted. Subsequently, a fourth driving signal is transmitted to drive the relay RLY1, the relay RLY2 and the relay RLY5 to be turned on. As described above, since a contact of a relay acts at a time instant later than a time instant when the driving signal is transmitted, the relay RLY1, the relay RLY2 and the relay RLY5 are actually turned on at a time instant later than a time instant when the fourth driving signal is transmitted. After a short time period, at a time instant t7, contacts of the relay RLY1, the relay RLY2 and the relay RLY5 are turned on. After a short time period, at a time instant t8, the switching transistor Q1 performs PWM in the mains power supply mode, the switching transistor Q2 is turned off, and the rectifier converter of the UPS completely operate in the mains power supply mode.

In the embodiment, the Vienna rectifier and the battery discharger are reused. In the mains power supply mode and the battery power supply mode, the relay RLY1, the relay RLY2, the relay RLY5, the relay RLY3 and the relay RLY4 are used to switch, to reuse the Vienna rectifier. Compared with the conventional rectifier converter of the UPS, especially the rectifier converter of the UPS shown in FIG. 1, the device utilization is improved, and the cost and volume of the rectifier converter are greatly reduced.

Figure 7:
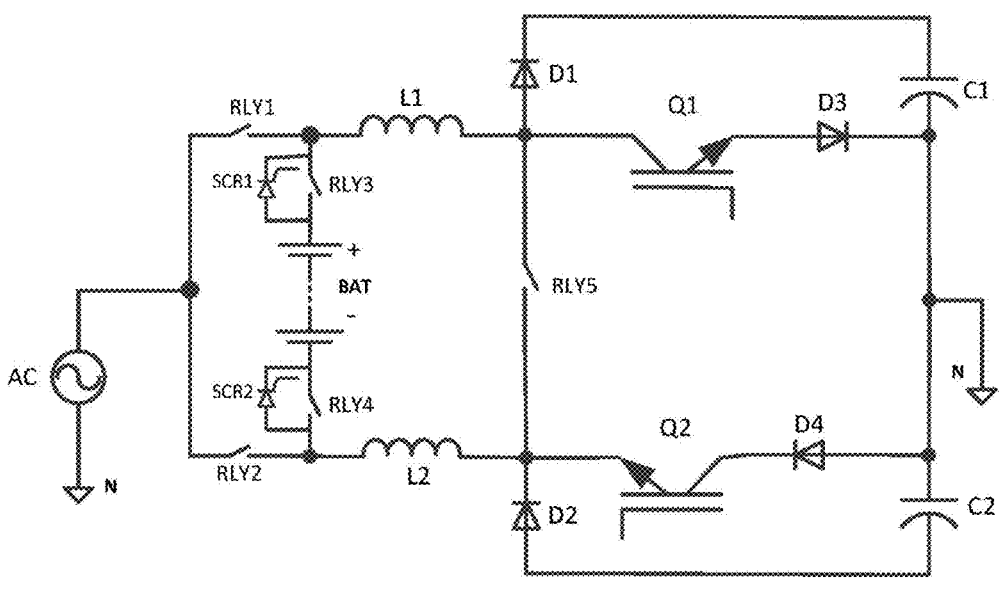
FIG. 7 is a circuit diagram of a rectifier converter of a UPS according to another embodiment of the present disclosure.
Figure 8:
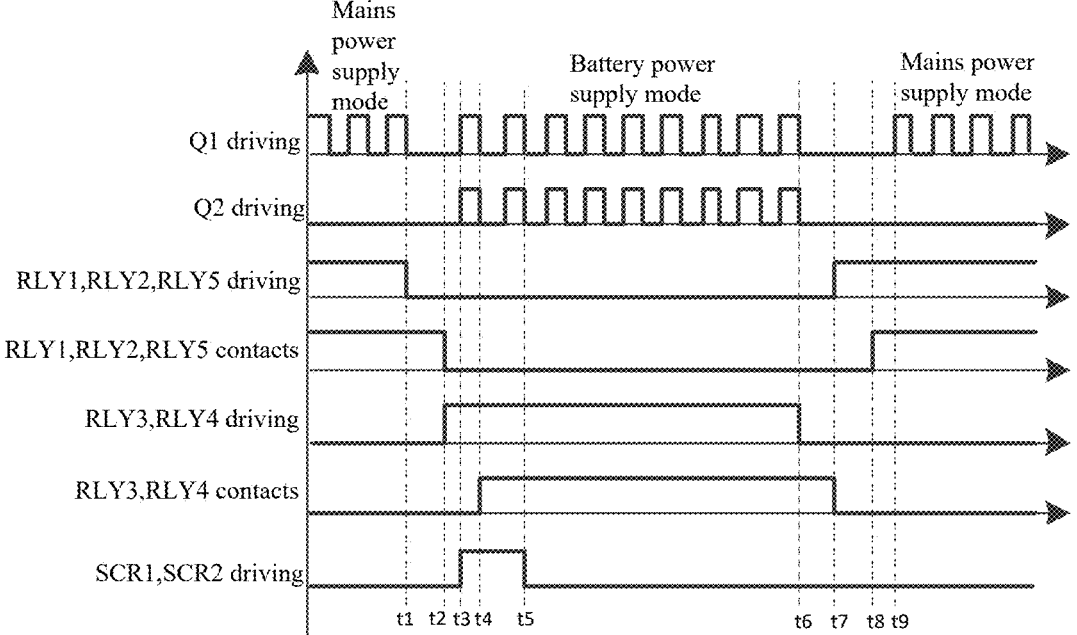
FIG. 8 is a sequence diagram showing switching between a battery power supply and a mains power supply for a rectifier converter of a UPS shown in FIG. 7.
Figures 9, 10A:
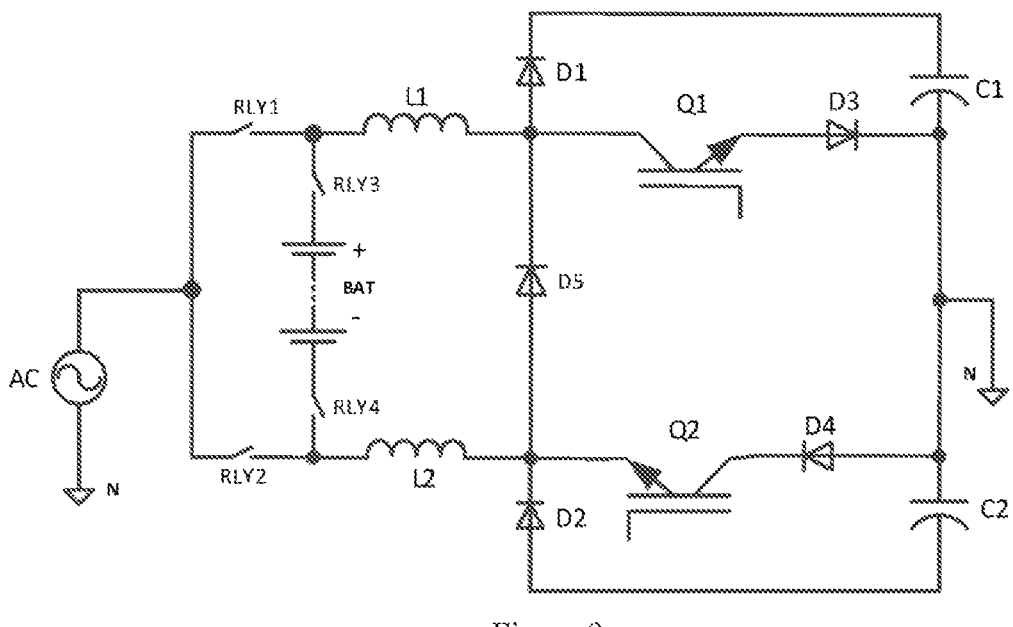
FIG. 9 is a circuit diagram of a rectifier converter of a UPS according to another embodiment of the present disclosure.
FIGS. 10A to 10D are schematic diagrams respectively showing a direction of a current flowing through a rectifier converter of a UPS shown in FIG. 9 in a case that a mains power supply supplies power to the rectifier converter.

FIG. 7 is a circuit diagram of a rectifier converter of a UPS according to another embodiment of the present disclosure. FIG. 8 is a sequence diagram showing switching between a battery power supply and a mains power supply for a rectifier converter of a UPS shown in FIG. 7. For the embodiment shown in FIG. 6, in order to reduce a time period for which the mains power supply mode is switched to the battery power supply mode, the relay RLY3 is connected in parallel with a thyristor SCR1, and the relay RLY4 is connected in parallel with a thyristor SCR2, as shown in FIG. 7, which can reduce capacitance of the bus capacitor C1 and capacitance of the bus capacitor C2, and save the cost and the volume of the rectifier converter. The thyristors only operate during switching, has short operating time period and low loss. Therefore, the thyristor is not required to be provided with a radiator, and a thyristor with small capacity may be used. The specific switching control sequence is shown in FIG. 8. At the time instant t2, the contacts of the relay RLY1, the relay RLY2 and the relay RLY5 are turned off. After a time period until the contacts are completely turned off, the thyristor SCR1 and the thyristor SCR2 are driven to be turned on at the time instant t3, the switching transistor Q1 and the switching transistor Q2 perform PWM in the battery power supply mode, and the rectifier converter of the UPS is switched to the battery power supply mode without waiting for the contacts of the relay RLY3 and the relay RLY4 to be turned on at the time instant t4 before switching to the battery power supply mode. At the time instant t4, the contacts of the relay RLY3 and the relay RLY4 are turned on, and the current flows from the thyristor SCR1 and the thyristor SCR2 to the relay RLY3 and the relay RLY4. At the time instant t5, the contacts of the relay RLY3 and the relay RLY4 are ensured to be completely turned on, and the thyristor SCR1 and the thyristor SCR2 are driven to be turned off. Alternatively, the thyristor SCR1 and the thyristor SCR2 are driven to be turned off at a time instant t6. In this way, the time period for which the rectifier converter of the UPS is switched from the mains power supply mode to the battery power supply mode is shortened. FIG. 9 is a circuit diagram of a rectifier converter of a UPS according to another embodiment of the present disclosure. FIGS. 10A to 10D are schematic diagrams respectively showing a direction of a current flowing through the rectifier converter of the UPS shown in FIG. 9 in a case that a mains power supply supplies power to the rectifier converter. The embodiment shown in FIG. 9 is similar to the embodiment shown in FIG. 3, and the difference is that the relay RLY5 is replaced with a diode D5. As shown in FIG. 9, a cathode of the diode D5 is connected to the third terminal of the filtering unit 110 and the first terminal of the rectifier discharge unit 120, and an anode of the diode D5 is connected to the fourth terminal of the filtering unit 110 and the second terminal of the rectifier discharge unit 120. That is, the cathode of the diode D5 is connected to the second terminal of the inductor L1, the anode of the diode D1 and the collector of the switching transistor Q1, and the anode of the diode D5 is connected to the second terminal of the inductor L2, and the cathode of the diode D2 and the emitter of the switching transistor Q2. In this way, the Vienna rectifier and the battery discharger can be reused.

Figure 10B:
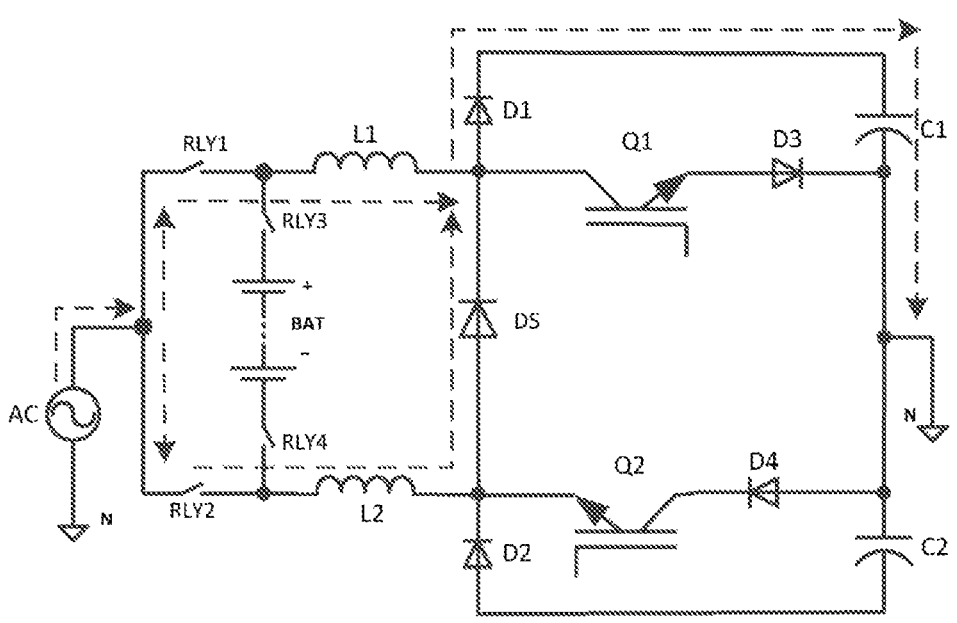

In the mains power supply mode, the relay RLY1 and the relay RLY2 are turned on, and the relay RLY3 and the relay RLY4 are turned off. In a case that the mains power supply is in the positive half cycle, the switching transistor Q1 performs PWM, and the switching transistor Q2 is turned off (which may be turned on or off simultaneously with the switching transistor Q1). When the switching transistor Q1 is turned on, the current inputted from the mains power supply flows through the relay RLY1, the relay RLY2, the inductor L1, the inductor L2, the diode D5, the switching transistor Q1 and the diode D3, and the current flowing through the inductor L1 and the inductor L2 increases, as shown in FIG. 10A. When the switching transistor Q1 is turned off, the current inputted from the mains power supply flows through the relay RLY1, the relay RLY2, the inductor L1, the inductor L2, the diode D5, the diode D1 and the capacitor C1, the current flowing through the inductor L1 and the inductor L2 decreases, and the current charges the capacitor C1, as shown in FIG. 10B.

Figure 10C:
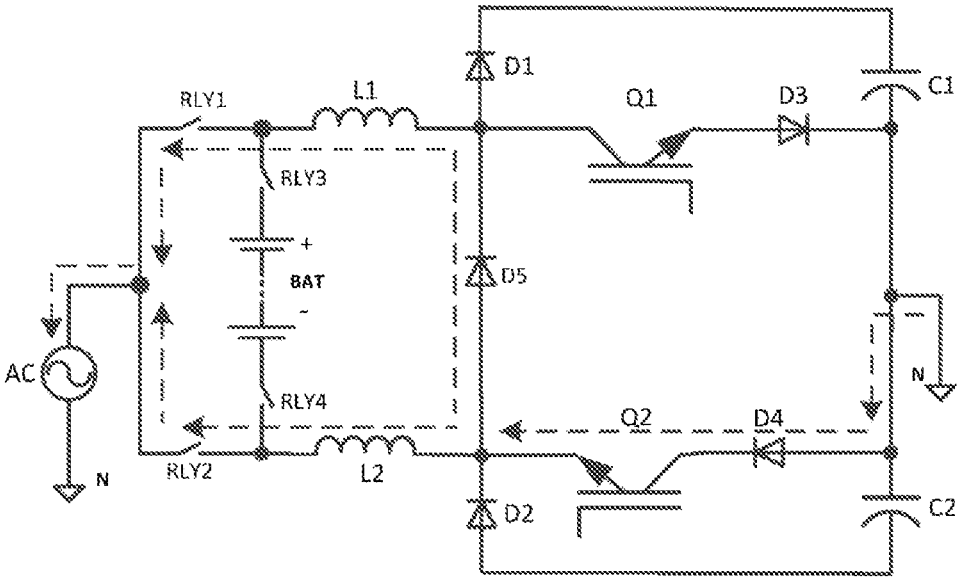
Figure 10D:
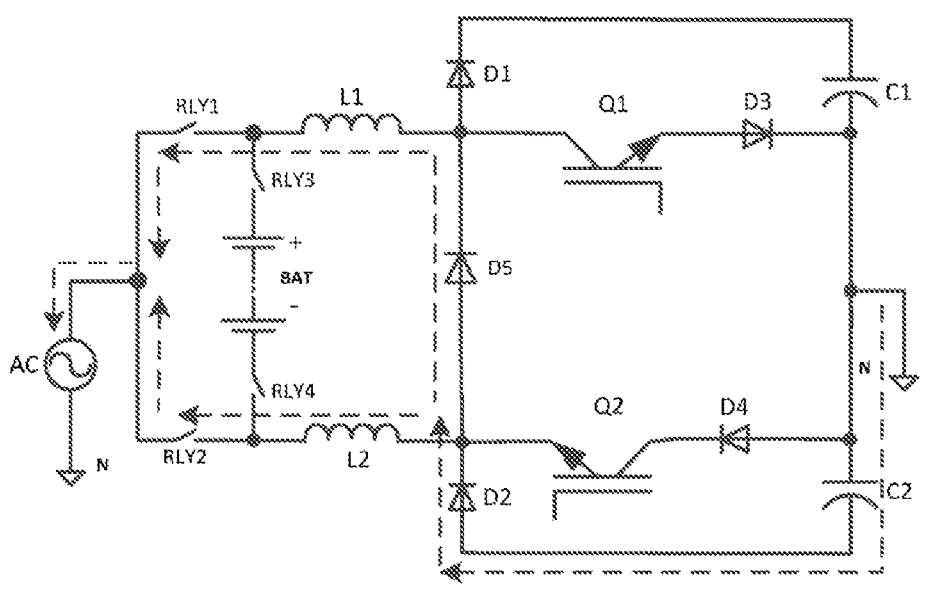

In a case that the mains power supply is in the negative half cycle, the switching transistor Q2 performs PWM, and the switching transistor Q1 is turned off (which may be turned on or off simultaneously with the switching transistor Q2). When the switching transistor Q2 is turned on, the current inputted from the mains power supply flows through the relay RLY1, the relay RLY2, the inductor L1, the inductor L2, the diode D5, the switching transistor Q2 and the diode D4, and the current flowing through the inductor L1 and the inductor L2 increases, as shown in FIG. 10C. When the switching transistor Q2 is turned off, the current inputted from the mains power supply flows through the relay RLY1, the relay RLY2, the inductor L1, the inductor L2, the diode D5, the diode D2 and the capacitor C2, the current flowing through the inductor L1 and the inductor L2 decreases, and the current charges the capacitor C2, as shown in FIG. 10D.

In the battery power supply mode, the relay RLY1 and the relay RLY2 are turned off, and the relay RLY3 and the relay RLY4 are turned on. The switching transistor Q1 and the switching transistor Q2 perform PWM. The operation processes of the circuit are the same as that in FIGS. 5A to 5B, which are not described herein.

Figure 11:
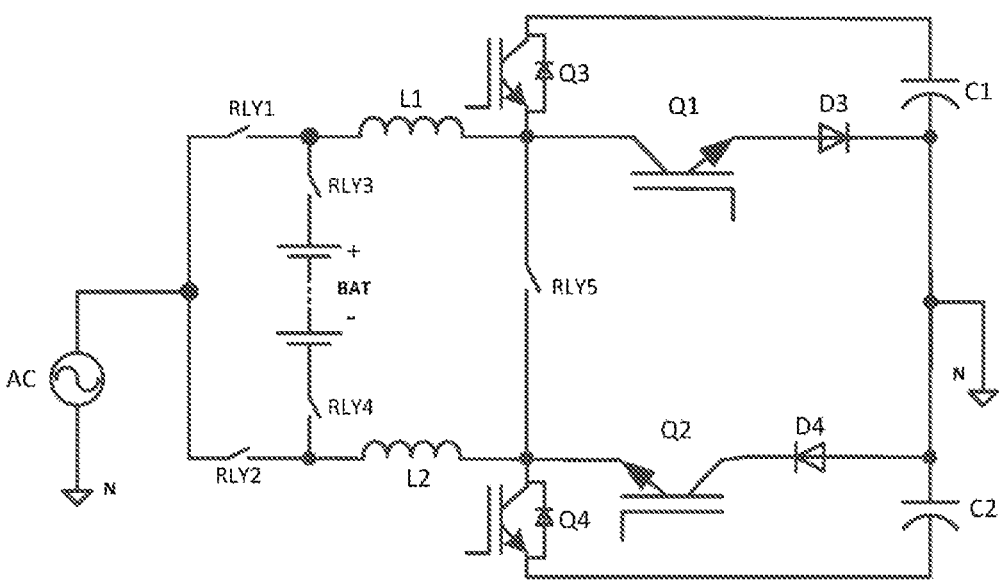
FIG. 11 is a circuit diagram of a rectifier converter of a UPS according to another embodiment of the present disclosure.

FIG. 11 is a circuit diagram of a rectifier converter of a UPS according to another embodiment of the present disclosure. In the embodiment shown in FIG. 11, the diode D1 and the diode D2 in the embodiment shown in FIG. 3 are replaced with a switching transistor Q3 and a switching transistor Q4. A base of the switching transistor Q3 and a base of the switching transistor Q4 receive control signals. An emitter of the switching transistor Q3 is connected to the inductor L1, the relay RLY5 and the collector of the switching transistor Q1. A collector of the switching transistor Q3 is connected to the capacitor C1. An emitter of the switching transistor Q4 is connected to the capacitor C2, and a collector of the switching transistor Q4 is connected to the inductor L2, the relay RLY5 and the emitter of the switching transistor Q2. Therefore, power may be transmitted from the direct-current bus capacitors C1 and C2 to the mains power supply. In a case that power is transmitted from the direct-current bus to the mains power supply, it is assumed that when the mains power supply is in the positive half cycle, the relay RLY1, the relay RLY2 and the relay RLY5 are turned on, the relay RLY3 and the relay RLY4 are turned off, the switching transistor Q1 and the switching transistor Q4 are turned off, and the switching transistor Q3 and the switching transistor Q2 perform PWM; and when the mains power supply is in the negative half cycle, the relay RLY1, the relay RLY2 and the relay RLY5 are turned on, the relay RLY3 and the relay RLY4 are turned off, the switching transistor Q2 and the switching transistor Q3 are turned off, and the switching transistor Q4 and the switching transistor Q1 perform PWM. The rectifier converter of the UPS can achieve bi-directional flow of power between the mains power supply and the direct bus.

In an embodiment of the present disclosure, the switching transistors Q1 to Q4 may be implemented by a triode, MOSFET or IGBT. The MOSFET may be SIMOS, SIC-MOS, or GaN. In an embodiment of the present disclosure, each of the switching transistors Q1 to Q4 may be connected in parallel with a reverse diode. In an embodiment of the present disclosure, the switching transistors Q1 to Q4 may have respective body diodes. In an embodiment of the present disclosure, the relays RLY1 to RLY5 may be implemented by any appropriate switching devices, such as contactors or switches.

Figure 12:
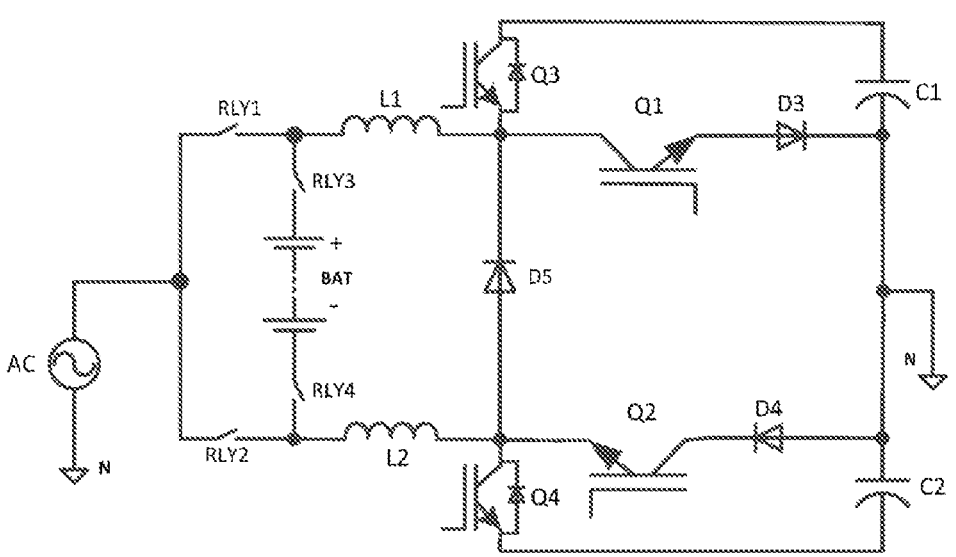
FIG. 12 is a circuit diagram of a rectifier converter of a UPS according to another embodiment of the present disclosure.
Figure 13A:
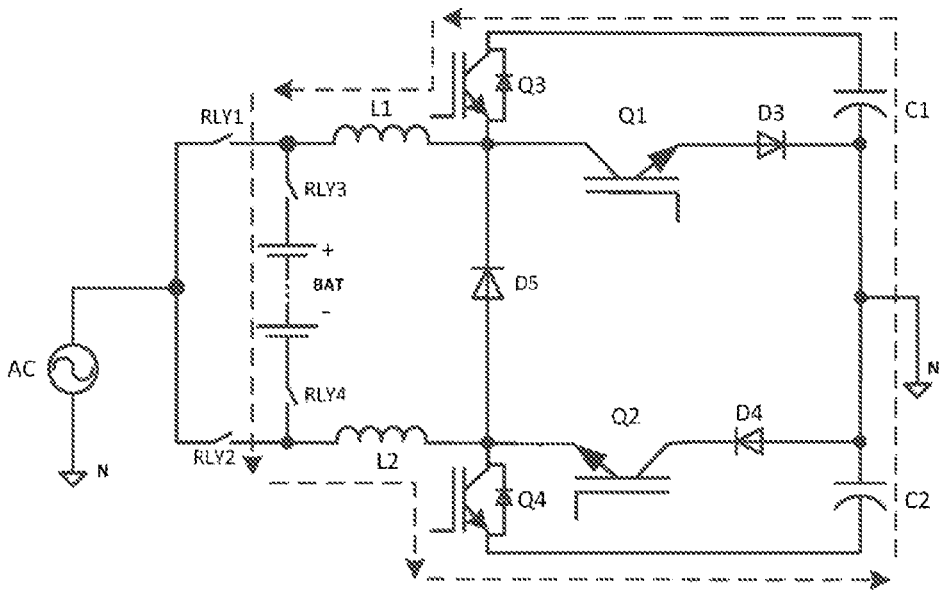
FIGS. 13A to 13B are schematic diagrams respectively showing a direction of a current flowing through a rectifier converter of a UPS shown in FIG. 12.
Figure 13B:
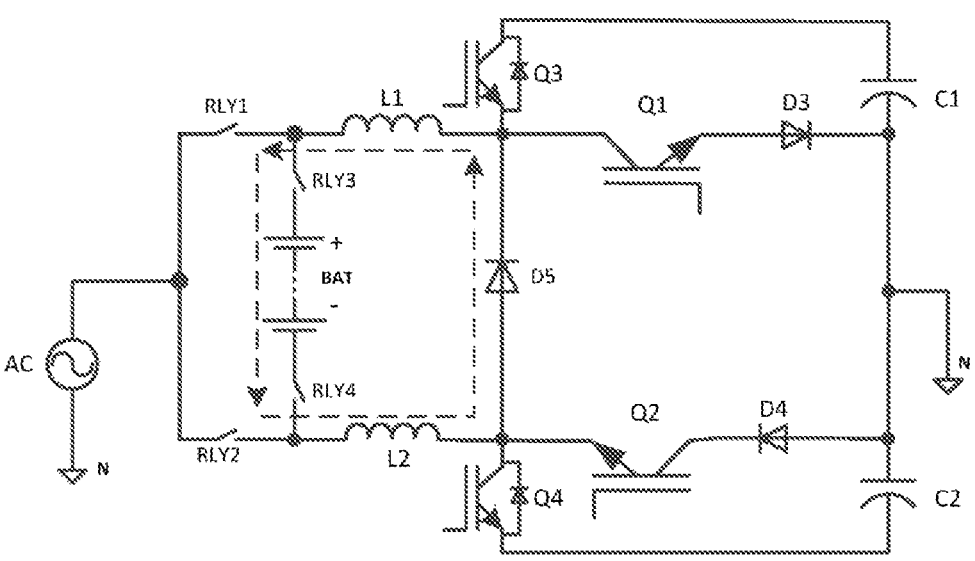

FIG. 12 is a circuit diagram of a rectifier converter of a UPS according to another embodiment of the present disclosure. FIGS. 13A to 13B schematic diagrams respectively showing a direction of a current flowing through a rectifier converter of a UPS shown in FIG. 12. The embodiment shown in FIG. 12 is similar to the embodiment shown in FIG. 11, and the difference is that the relay RLY5 is replaced with the diode D5, and the direct-current bus capacitors C1 and C2 may charge the battery power supply BAT. During the charging, the relay RLY1 and the relay RLY2 are turned off, the relay RLY3 and the relay RLY4 are turned on, the switching transistor Q1 and the switching transistor Q2 are turned off, and the switching transistor Q3 and the switching transistor Q4 perform PWM. When the switching transistor Q3 and the switching transistor Q4 are turned on, the current flows through the capacitor C1, the capacitor C2, the switching transistor Q3, the inductor L1, the relay RLY3, the battery power supply BAT, the relay RLY4, the inductor L2 and the switching transistor Q4, and the current flowing through the inductor L1 and the inductor L2 increases, as shown in FIG. 13A. When the switching transistor Q3 and the switching transistor Q4 are turned off, the current flows through the diode D5, the inductor L1, the relay RLY3, the battery power supply BAT, the relay RLY4 and the inductor L2, and the current flowing through the inductor L1 and the inductor L2 decreases, as shown in FIG. 13B. In a multi-phase rectifier converter, some phases may operate in the mains power supply mode, and the other phases may charge the battery.

In the rectifier converter of the UPS according to the present disclosure, the first mains switching module, the second mains switching module and the battery switching module can switch the rectifier discharge reuse module in two cases of the mains power supply and the battery power supply, and the rectifier discharge reuse module can achieve the functions of the rectifier and the battery discharger, that is, the rectifier and the battery discharger are reused, thereby saving devices and greatly reducing the cost and the volume of the UPS.

The embodiments of the present disclosure further relate to a method for controlling the rectifier converter of the UPS. The method includes: controlling the first mains switching module and the second mains switching module to be turned on, and the battery switching module to be turned off, to control the filtering unit and the rectifier discharge unit to rectify and output the current inputted by the mains power supply, in case that the mains power supply supplies power to the rectifier converter; and controlling the battery switching module to be turned on, and the first mains switching module and the second mains switching module to be turned off, to control the filtering unit and the rectifier discharge unit to discharge and output the current inputted from the battery power supply, in a case that the battery power supply supplies power to the rectifier converter.

In an embodiment of the present disclosure, the method for controlling the rectifier converter of the UPS further includes:

controlling a third switching device, a fourth switching device and a fifth switching device to be turned on, controlling a first switching device and a second switching device to be turned off, and controlling the filtering unit and the rectifier discharge unit to rectify and output the current inputted by the mains power supply, in a case that the mains power supply supplies power to the rectifier converter;

when a power supply of the rectifier converter is started to be switched from the mains power supply to the battery power supply, transmitting a first driving signal to drive the third switching device, the fourth switching device and the fifth switching device to be turned off, and on receipt of the first driving signal, the third switching device, the fourth switching device and the fifth switching device are turned off; and transmitting a second driving signal to drive the first switching device and the second switching device to be turned on, on receipt of the second driving signal, the first switching device and the second switching device are turned on, and controlling the filtering unit and the rectifier discharge unit to discharge and output the current inputted from the battery power supply, where the third switching device, the fourth switching device and the fifth switching device are actually turned off at a time instant later than a time instant when the first driving signal is transmitted; and the first switching device and the second switching device are actually turned on at a time instant later than a time instant when the second driving signal is transmitted;

when a power supply of the rectifier converter is started to be switched from the battery power supply to the mains power supply, transmitting a third driving signal to drive the first switching device and the second switching device to be turned off, and on receipt of the third driving signal, the first switching device and the second switching device are turned off; and transmitting a fourth driving signal to drive the third switching device, the fourth switching device and the fifth switching device to be turned on, on receipt of the fourth driving signal, the third switching device, the fourth switching device and the fifth switching device are turned on, and controlling the filtering unit and the rectifier discharge unit to rectify and output the current inputted from the mains power supply, where the first switching device and the second switching device are actually turned off at a time instant later than a time instant when the third driving signal is transmitted; and the third switching device, the fourth switching device and the fifth switching device are actually turned on at a time instant later than a time instant when the fourth driving signal is transmitted.

Other embodiments of the method for controlling the rectifier converter of the UPS according to the present disclosure may refer to the specific process of controlling the rectifier converter of the UPS as described above, which are not described herein.

Although the present disclosure is disclosed above through specific embodiments, those skilled in the art should understand that various modifications and equivalents can be made to the present disclosure without departing from the scope of the present disclosure. In addition, various modifications may be made to the present disclosure for specific situations or materials without departing from the scope of the present disclosure. Therefore, the present disclosure is not limited to the disclosed specific embodiments, and should include all embodiments falling within the scope of the claims of the present disclosure.

The foregoing embodiments are only preferred embodiments of the present disclosure and are not intended to limit the present disclosure. All modifications, equivalent variations and improvements made within the spirit and scope of the present disclosure should be considered to be included in the scope claimed by the present disclosure.

The invention claimed is:

1. A rectifier converter of an uninterruptible power supply (UPS), comprising: a rectifier discharge reuse module, a first mains switching module, a second mains switching module and a battery switching module, wherein the rectifier discharge reuse module comprises a filtering unit and a rectifier discharge unit that are connected to each other;

the battery switching module is connected between a battery power supply and the filtering unit, and operates in a case that the battery power supply supplies power to the rectifier converter, to control the filtering unit and the rectifier discharge unit to discharge and output a current inputted from the battery power supply; and the first mains switching module is connected between a mains power supply and the filtering unit, the second mains switching module is connected between the filtering unit and the rectifier discharge unit, and the first mains switching module and the second mains switching module operate in a case that the mains power supply supplies power to the rectifier converter, to control the filtering unit and the rectifier discharge unit to rectify and output a current inputted from the mains power supply, wherein the battery switching module comprises a first switching device connected between an anode of the battery power supply and a first terminal of the filtering unit, and a second switching device connected between a cathode of the battery power supply and a second terminal of the filtering unit, and wherein the first mains switching module comprises a third switching device connected between the mains power supply and the first terminal of the filtering unit, and a fourth switching device connected between the mains power supply and the second terminal of the filtering unit; and the second mains switching module comprises a fifth switching device, a first terminal of the fifth switching device is connected to a third terminal of the filtering unit and a first terminal of the rectifier discharge unit, and a second terminal of the fifth switching device is connected to a fourth terminal of the filtering unit and a second terminal of the rectifier discharge unit.

2. The rectifier converter of the UPS according to claim 1, wherein in a case that the mains power supply supplies power to the rectifier converter, the third switching device, the fourth switching device and the fifth switching device are turned on, the first switching device and the second switching device are turned off, and the filtering unit and the rectifier discharge unit are configured to rectify and output the current inputted by the mains power supply.

3. The rectifier converter of the UPS according to claim 1, wherein when a power supply of the rectifier converter is started to be switched from the mains power supply to the battery power supply, a first driving signal is transmitted to drive the third switching device, the fourth switching device and the fifth switching device to be turned off, on receipt of the first driving signal, the third switching device, the fourth switching device and the fifth switching device are turned off, a second driving signal is transmitted to drive the first switching device and the second switching device to be turned on, on receipt of the second driving signal, the first switching device and the second switching device are turned on, and the filtering unit and the rectifier discharge unit are configured to discharge and output the current inputted from the battery power supply, wherein the third switching device, the fourth switching device and the fifth switching device are actually turned off at a time instant later than a time instant when the first driving signal is transmitted, and the first switching device and the second switching device are actually turned on at a time instant later than a time instant when the second driving signal is transmitted.

4. The rectifier converter of the UPS according to claim 1, wherein when a power supply of the rectifier converter is started to be switched from the battery power supply to the mains power supply, a third driving signal is transmitted to drive the first switching device and the second switching device to be turned off, on receipt of the third driving signal, the first switching device and the second switching device are turned off, a fourth driving signal is transmitted to drive the third switching device, the fourth switching device and the fifth switching device to be turned on, on receipt of the fourth driving signal, the third switching device, the fourth switching device and the fifth switching device are turned on, and the filtering unit and the rectifier discharge unit are configured to rectify and output the current inputted from the mains power supply, wherein the first switching device and the second switching device are actually turned off at a time instant later than a time instant when the third driving signal is transmitted, and the third switching device, the fourth switching device and the fifth switching device are actually turned on at a time instant later than a time instant when the fourth driving signal is transmitted.

5. The rectifier converter of the UPS according to claim 1, wherein each of the first switching device, the second switching device, the third switching device and the fourth switching device comprises a relay or a contactor, and the fifth switching device comprises a relay, a contactor or a diode.

6. The rectifier converter of the UPS according to claim 1, wherein each of the first switching device and the second switching device is connected in parallel with a thyristor.

7. The rectifier converter of the UPS according to claim 1, wherein the rectifier discharge unit comprises a first rectifier device, a second rectifier device, a third diode, a fourth diode, a first switching transistor, a second switching transistor, a first capacitor and a second capacitor, a first terminal of the first rectifier device and a first terminal of the first switching transistor are connected to a second terminal of the first inductor and a first terminal of the second mains switching module, a second terminal of the first rectifier device is connected to a first terminal of the first capacitor, a second terminal of the second rectifier device and a second terminal of the second switching transistor are connected to a second terminal of the second inductor and a second terminal of the second mains switching module, a first terminal of the second rectifier device is connected to a second terminal of the second capacitor, a second terminal of the first switching transistor is connected to a first terminal of the third diode, a second terminal of the third diode is connected to a second terminal of the first capacitor, a first terminal of the second switching transistor is connected to a second terminal of the fourth diode, a first terminal of the fourth diode is connected to a first terminal of the second capacitor, and a control terminal of the first switching transistor and a control terminal of the second switching transistor are configured to receive control signals.

8. The rectifier converter of the UPS according to claim 7, wherein the first rectifier device comprises a third switching transistor, the second rectifier device comprises a fourth switching transistor, a third terminal of the third switching transistor and a third terminal of the fourth switching transistor are configured to receive control signals, a first terminal of the third switching transistor is connected to the first terminal of the first switching transistor and the second terminal of the first inductor, a second terminal of the third switching transistor is connected to the first terminal of the first capacitor, a second terminal of the fourth switching transistor is connected to the second terminal of the second switching transistor and the second terminal of the second inductor, and a first terminal of the fourth switching transistor is connected to the second terminal of the second capacitor.

9. The rectifier converter of the UPS according to claim 7, wherein each of the first switching transistor and the second switching transistor comprises a triode, MOSFET or IGBT.

10. The rectifier converter of the UPS according to claim 1, wherein the filtering unit comprises a first inductor and a second inductor, a first terminal of the first inductor is connected to a first terminal of the first mains switching module and a first terminal of the battery switching module, a first terminal of the second inductor is connected to a second terminal of the first mains switching module and a second terminal of the battery switching module, a second terminal of the first inductor is connected to a first terminal of the rectifier discharge unit, and a second terminal of the second inductor is connected to a second terminal of the rectifier discharge unit.

11. The rectifier converter of the UPS according to claim 7, wherein the first rectifier device comprises a first diode, the second rectifier device comprises a second diode, an anode of the first diode is connected to the first terminal of the first switching transistor and the second terminal of the first inductor, a cathode of the first diode is connected to the first terminal of the first capacitor, a cathode of the second diode is connected to the second terminal of the second switching transistor and the second terminal of the second inductor, and an anode of the second diode is connected to the second terminal of the second capacitor.

12. The rectifier converter of the UPS according to claim 7, wherein each of the first switching transistor and the second switching transistor is connected in parallel with a reverse diode, or the first switching transistor and the second switching transistor have respective body diodes.

13. A method for controlling a rectifier converter of an uninterruptible power supply (UPS), applied to the rectifier converter of the UPS according to claim 1, comprising:

controlling the first mains switching module and the second mains switching module to be turned on and the battery switching module to be turned off, to control the filtering unit and the rectifier discharge unit to rectify and output the current inputted by the mains power supply, in a case that the mains power supply supplies power to the rectifier converter; and controlling the battery switching module to be turned on and the first mains switching module and the second mains switching module to be turned off, to control the filtering unit and the rectifier discharge unit to discharge and output the current inputted from the battery power supply, in a case that the battery power supply supplies power to the rectifier converter.

* * * * *